United States Patent
Li et al.

(10) Patent No.: US 8,732,741 B2
(45) Date of Patent: May 20, 2014

(54) SYSTEM AND METHOD FOR RESTRICTING ACCESS TO A SET-TOP BOX

(75) Inventors: Jian Li, San Ramon, CA (US); Zhi Li, Martinez, CA (US); Sun-Uk Park, Union City, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 596 days.

(21) Appl. No.: 11/964,964

(22) Filed: Dec. 27, 2007

(65) Prior Publication Data

US 2009/0172767 A1 Jul. 2, 2009

(51) Int. Cl.
*H04N 7/16* (2011.01)

(52) U.S. Cl.
USPC .............. 725/25; 725/40; 725/50; 725/115

(58) Field of Classification Search
USPC .................................. 725/115, 46, 50, 40, 25
See application file for complete search history.

(56) References Cited

U.S. PATENT DOCUMENTS

| | | | |
|---|---|---|---|
| 6,040,829 A * | 3/2000 | Croy et al. ................... | 715/864 |
| 6,243,000 B1 | 6/2001 | Tsui | |
| 6,633,235 B1 * | 10/2003 | Hsu et al. ................... | 340/12.28 |
| 6,882,299 B1 * | 4/2005 | Allport ........................ | 341/176 |
| 6,882,729 B2 * | 4/2005 | Arling et al. ................ | 380/274 |
| 6,906,635 B1 * | 6/2005 | Moutaux et al. ............. | 340/4.3 |
| 2003/0129949 A1 | 7/2003 | Selektor | |
| 2003/0144056 A1 * | 7/2003 | Leifer et al. ................. | 463/39 |
| 2006/0143682 A1 * | 6/2006 | Baekeland et al. .......... | 725/135 |
| 2007/0052548 A1 | 3/2007 | Hankin et al. | |
| 2007/0069919 A1 | 3/2007 | Lee | |
| 2008/0066131 A1 * | 3/2008 | Chang et al. ................ | 725/113 |
| 2009/0128392 A1 * | 5/2009 | Hardacker et al. .......... | 341/175 |

* cited by examiner

*Primary Examiner* — J. Rabovianski
(74) *Attorney, Agent, or Firm* — Jackson Walker L.L.P.

(57) ABSTRACT

A system and method is disclosed for restricting a remote control interface port of a set-top box configured to broadcast multimedia programs over a provider network. A change schedule that changes communication parameters may restrict the remote control interface port. The operating frequency or the code set used to transmit data and commands may be changed at random or at predefined intervals. The set-top box, the remote control, or an external network device may initiate the change schedule. Encryption of communications between the set-top box and the remote control unit may also be performed to protect the set-top box from unauthorized access.

9 Claims, 3 Drawing Sheets

SYSTEM AND METHOD FOR RESTRICTING ACCESS TO A SET-TOP BOX

BACKGROUND

1. Field of the Disclosure

The present disclosure generally relates to providing multimedia content, and more specifically, to restricting set-top box remote control functions.

2. Description of the Related Art

Multimedia content such as broadcast programs may be provided to a customer via a set-top box located at the customer premises. In some cases, set-top boxes are controlled remotely by apparatuses that, without authorization, retransmit broadcast programs over the Internet, for example.

DESCRIPTION OF THE EMBODIMENT(S)

Figure 1:
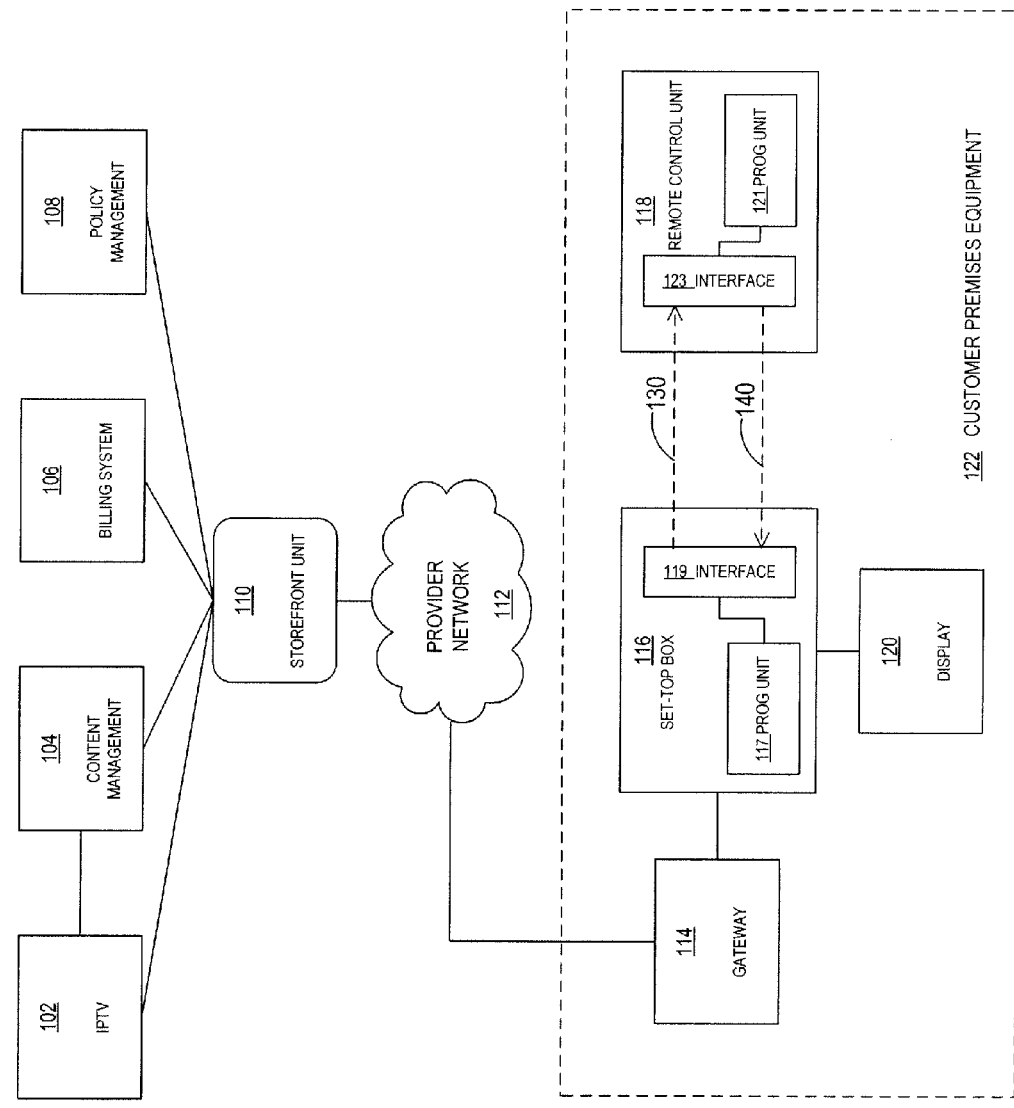
FIG. 1 illustrates one embodiment of a provider network including a set-top box controlled by a remote control unit.

In one aspect, a system for remotely controlling a set-top box coupled to a provider network is disclosed. The system comprises a remote control unit for bidirectional communication via an interface medium with the set-top box. The system also comprises a first interface programming unit for programming a first interface port, wherein the first interface port enables the remote control unit to communicate with the set-top box via the interface medium. The system further comprises a second interface programming unit for programming a second interface port, wherein the second interface port enables the set-top box to communicate with the remote control unit via the interface medium. The system still further comprises a change schedule stored in a memory, wherein the change schedule causes the first and second interface programming units to program the first and second interface ports, respectively. In some embodiments, programming the first and second interface ports includes programming an operating frequency of the interface medium, and the first and second interface ports communicate bidirectionally using the operating frequency. The operating frequency of the interface medium may be selected not to interfere with other interfaces in the vicinity of the set-top box. In certain embodiments, the interface medium is a digital data interface, and programming the first and second interface ports includes programming a code set of the interface medium. The interface medium may be a wireless medium. In some embodiments, the remote control unit further includes a first processor, and a first memory, including program instructions executable by the first processor, wherein the change schedule is stored in the first memory. In particular embodiments, the set-top box further includes a second processor, and a second memory, including program instructions executable by the second processor, wherein the change schedule is stored in the second memory. The remote control unit may galvanically contact the set-top box in order to program the first interface port. In some embodiments, the change schedule causes, via the provider network, the first and second interface programming units to program the first and second interface ports, respectively, and the change schedule is stored in a memory communicatively coupled to the provider network. The bidirectional communication between the remote control and the set-top box may include encrypted communication. The memory may be a removable storage medium. In some embodiments, the change schedule includes randomized points in time for programming the first and second interface ports.

In another aspect, a set-top box coupled to a provider network is disclosed. The set-top box comprises a processor, an interface port, wherein the interface port enables the set-top box to communicate bidirectionally with a remote control unit, and a memory, including program instructions executable by the processor to program the interface port, wherein parameters for communicating with the remote control unit are changed. The parameters for communicating with the remote control unit include an operating frequency of the interface port, while the operating frequency of the interface port may be selected not to interfere with other interfaces in the vicinity of the set-top box. The interface port may be a digital data interface, and programming the interface port may include programming a code set for communicating with the remote control unit. The remote control unit may galvanically contact the set-top box in order to synchronize with the set-top box. The bidirectional communication between the remote control and the set-top box may include encrypted communication.

In an additional aspect, a remote control unit for controlling a set-top box coupled to a provider network is disclosed. The remote control unit comprises a processor, an interface port, wherein the interface port enables the remote control unit to communicate bidirectionally with the set-top box, and a memory, including program instructions executable by the processor to program the interface port, wherein parameters for communicating with the set-top box are changed. The parameters for communicating with the remote control unit may include an operating frequency of the interface port, while the operating frequency of the interface port may be selected not to interfere with other interfaces in the vicinity of the set-top box. In some embodiments, the interface port is a digital data interface, and programming the interface port includes programming a code set for communicating with the set-top box. The remote control unit may galvanically contact the set-top box in order to synchronize with the set-top box.

In still another aspect, a method is disclosed for controlling an Internet Protocol Television (IPTV) broadcast to a set-top box. The method comprises synchronizing a first interface port coupled to the set-top box with a second interface port coupled to a remote control unit, wherein a first set of synchronization parameters is used. The method further comprises operating the remote control unit to control the IPTV broadcast to the set-top box, wherein the first interface port and the second interface port communicate bidirectionally. The method still further comprises changing the first set of synchronization parameters to a second set of synchronization parameters, and re-synchronizing the first and second interface ports to the second set of synchronization parameters. The first set of synchronization parameters may include an operating frequency for the first and second interface ports, while the second set of synchronization parameters may include a code set for bidirectional communication between the first and second interface ports.

In the following description, for the purposes of explanation, numerous specific details are set forth in order to provide a thorough understanding of the disclosed embodiments. A person of ordinary skill in the art should recognize that embodiments may be practiced without some of these specific details. In other instances, well-known structures and devices may be shown in block diagram form or omitted for clarity.

Television programs, movies, radio programming and other multimedia content may be distributed over a "provider network," which may include telephone company networks, coaxial-based networks, Ethernet networks, satellite transmissions, WiFi transmission, WiMAX transmission, and the like. In some systems, for example traditional coaxial-based "cable" systems, a service provider may distribute through the same coaxial or fiber-optic cable a compound signal containing a number of television channels at different frequencies. In conjunction, a set-top box or a tuner within a television, radio, or recorder selects one or more channels from the compound signal to play or record. In contrast to such systems that simultaneously distribute every available channel at all times, IPTV systems generally distribute content only in response to user requests. Such IPTV systems typically use Internet Protocol (IP) and other technologies found in computer networks. To provide IPTV, a user's telephone lines may be used in some combination with a residential gateway (RG), a digital subscriber line (DSL) modem, a set-top box (STB), a display, and other such equipment to receive and convert into usable form the multimedia content provided from a telephone company network, for example.

IPTV providers, satellite-based providers, digital cable providers, and others may distribute multimedia content using bidirectional (i.e., two-way) communication between a user's customer premises equipment (CPE) and the service provider's equipment. In some embodiments, multimedia content is provided directly to a user's wireless communications device using IPTV, for example, streaming video and audio. Bidirectional communication allows a service provider to offer advanced features, such as video-on-demand (VOD), pay-per-view (PPV), advanced programming information, text-based news, and the like.

Accordingly, a user may use a remote control unit (RCU) to bidirectionally communicate with the STB, which in turn communicates to the provider via the gateway. Therefore, the remote control interface port of the STB presents an opportunity for third-parties to access the STB, and hence the provider network, in an unauthorized manner. For example, the multimedia content, which has been licensed by the user to view at the customer premises, may be rebroadcast to additional viewers using the signals accessible from the STB. An unrestricted remote control unit may also be emulated by an external device, which in combination with the rebroadcast, could enable remote control and rebroadcast of the entire multimedia content available from the provider.

Furthermore, in some instances, the rebroadcast and remote control of licensed multimedia content is provided via the Internet, which may result in substantial financial losses to the provider. Thus, properly restricting the remote control interface port of the STB is an essential component in securing the CPE from unauthorized, and perhaps illegal, usage by third parties.

The methods and systems disclosed herein provide embodiments for restricting a remote control interface port of an STB, which is accessed by an RCU. By changing the frequency and/or the code set shared by the STB and the remote control unit in a prescribed manner, the danger that an external device can emulate the remote control interface, and thus take control of the STB, may be mitigated or entirely eliminated. The communication parameters of the remote control interface, such as the frequency or choice of code set, may be changed using a change schedule stored in a memory. In one embodiment, the memory storing the change schedule is controlled by a processor included in the STB. In one embodiment, the memory storing the change schedule is controlled by a processor included in the remote control unit. Other embodiments, wherein the change schedule is controlled by an external network device, are also disclosed. The change schedule includes change events, which result in the re-programming of the remote control interface on the STB and the remote control unit. After reprogramming, the STB and the remote control unit may resynchronize themselves to each other. In some embodiments, the system is configured for a galvanic contact between the remote control unit and the STB for programming or synchronization. The change events may occur at random time intervals or in a regular manner. The communication parameters may also be changed at random or in a regular pattern. Encryption of communications over the remote control interface is implemented in some embodiments. The disclosed embodiments describe a remote control interface on the STB that is extremely difficult, impractical, or impossible to emulate by an external device.

FIG. 1 illustrates a communications platform 100 including an IPTV system 102 in communication with a storefront unit 110. Storefront unit 110 supplies a user with options for purchasing VOD and PPV content over the provider network 112. Further, storefront unit 110 communicates with a billing system 106 for verifying the credit, payment, and billing history for the user. Content management system 104 communicates through storefront unit 110 to present a content list of available programming (i.e., media content). In addition, storefront unit 110 interacts with a policy management unit 108 to ensure bandwidth availability in provider network 112 for any media content requested by the user.

As shown, IPTV system 102 distributes multimedia content to users of STB 116 for viewing on display 120 and possibly for sending to other components not shown, such as stereo equipment. In order to distribute the multimedia content, IPTV system 102 first gains access to the multimedia content. To that end, content management system 104 represents a variety of systems to acquire multimedia content, reformat it when necessary, and prepare it for transmission over provider network 112. In its capacity acquiring and distributing multimedia content for use on IPTV system 102, content management system 104 serves as a "content headend." Content management system 104 may include, for example, systems for capturing analog and/or digital content feeds, either directly from a content provider or from a content aggregation facility. Content feeds transmitted via VHF/UHF broadcast signals may be captured by a broadcast server (not shown in FIG. 1). Similarly, a live acquisition server may capture satellite signals, high-speed fiber feeds, or programming feeds sent over other suitable transmission means. Content feeds to a live acquisition server may include broadcasted multimedia content, for example premium audio/video programming (i.e., traditional "cable channels") widely available but not typically broadcast over airwaves. Content management system 104 may further include signal conditioning systems and content preparation systems for encoding content. As shown, content management system 104 includes a VOD importer server and may include a digital rights management (DRM) server for encrypting content (not shown). The stored VOD content may be distributed by multicast (i.e., a single stream sent simultaneously to multiple viewers) or by unicast to individual users in a VOD system. In some embodiments, the channels include broadcast channels sent over coaxial cables. The channels may also include broadband channels, for example high-speed, high-capacity data transmission channels that send and receive information on cable. The cable, which may be coaxial cable or fiber-optic cable, may have a wider bandwidth than conventional telephone lines, and may have the ability to carry video, voice, data, and other multimedia content simultaneously.

As shown, communications platform 100 includes the provider network 112. Provider network 112 provides a network translation as necessary from a switched network, for example, to the access technology used to transmit data and multimedia content to the consumer's location. For example, a service provider that uses twisted-pair telephone lines to deliver multimedia content to consumers may utilize digital subscriber lines within provider network 112. The digital subscriber lines may utilize some combination of DSL, DSL2, DSL2+, ADSL, VDSL or other technologies. In some embodiments, provider network 112 may use fiber-to-the-home (FTTH). In such cases, optical fiber may be used all the way to the consumer's location to easily provide high-bandwidth. In other embodiments, fiber-to-the-curb (FTTC) deployments are used to deliver multimedia content to consumers. In such cases, a digital subscriber line access multiplexer (DSLAM) may be used within provider network 112 to transfer signals containing multimedia content from optical fiber to copper wire for DSL delivery to consumers. In other embodiments, provider network 112 may use radio frequency (RF) signals sent over coaxial cables. Accordingly, provider network 112 may utilize quadrature amplitude modulation (QAM) equipment for downstream traffic. In these systems, provider network 112 may receive upstream traffic from a consumer's location using quadrature phase shift keying (QPSK) modulated RF signals.

As illustrated in FIG. 1, the IPTV system 102 is coupled for communication with user equipment via provider network 112. Provider network 112 may be referred to as the "last mile" for a service provider or network operator. It provides network connectivity of IPTV services to consumers' locations. IPTV system 102 may multicast multimedia content to multiple destinations. In contrast to a multicast or a unicast, some embodiments "broadcast" programming or data to all users on a network as a "broadcast" transmission. For example, a TV guide feature for displaying available programming may be broadcast to every user.

To deliver multimedia content, IPTV system 102 may employ any current or future Internet protocols for providing reliable real-time streaming multimedia content. In addition to Transmission Control Protocol (TCP), User Datagram Protocol (UDP), and Hypertext Transfer Protocol (HTTP), such protocols may use, in various combinations, other protocols including file transfer protocol (FTP), real-time transport protocol (RTP), real-time control protocol (RTCP), and real-time streaming protocol (RTSP), as examples. In some embodiments, IPTV system 102 sends multimedia content encapsulated into IP packets over provider network 112. For example, an MPEG-2 transport stream may be sent, in which the transport stream consists of a series of 188-byte transport packets, for example. To ensure quality of service, protocols should be chosen that minimize dropped packets, jitter, delay, data corruption, and other errors.

The communications platform 100 includes equipment 122 that is provided at the customer premises, referred to as CPE. Although a single CPE 122 is shown for clarity in FIG. 1, it will be understood that provider network 112 is configured to simultaneously provide service to a large number of CPE 122 installations, and thereby, to a plurality of STBs 116. The CPE 122 as shown in FIG. 1 is exemplary and other embodiments may use different configurations of CPE, as desired. It is noted that the "user" as referred to herein is the customer or a user of CPE 122 on behalf of the customer.

As depicted in FIG. 1, CPE 122 includes STB 116, which communicates with the provider network 112 through an RG 114. In one embodiment, the functions of RG 114 and STB 116 are integrated into a single appliance, such as a cable modem, a DSL modem, or the like. STB 116 is coupled to display 120 to provide a user with media content. For example, the media content may be streaming video, music, e-mail, or data. In some embodiments, the functionality of RG 114, STB 116, and display 120 are integrated into a single appliance such as a digital television or computer. STB 116 is also shown including a programming unit 117 and interface port 119. The programming unit 117 may be a device that can program, or configure, operational and communications parameters associated with interface port 119. In a particular embodiment, interface port 119 and programming unit 117 are combined in a single electronic device. As mentioned above, STB 116 may be remotely controlled using interface port 119, also referred to as a "remote control interface port." In certain embodiments, STB 116 also includes a processor and memory (not shown in FIG. 1). Program instructions stored in the memory and executable by the processor if STB 116 may perform the functionality of programming unit 117.

STB 116 converts digital compressed signals into a format suitable for display. STB 116 has functionality for recognizing and acting on IP packets, for example UDPs transmitted within IP datagrams. STB 116 may contain software or firmware coding for sending requests to an application server (not shown), for example, to receive requested programming or data. In some embodiments, requests for content (e.g., VOD content) flow through a billing or management server to verify that a user is not in arrears regarding payment. In some embodiments, STB 116 supports Web browsing on the Internet and may support cycling through guide data, for example, using Web services. STB 116 may be enabled for viewing e-mail, viewing e-mail attachments, and interfacing with various types of home networks.

In accordance with disclosed embodiments, STB 116 may be a cable box, a satellite box, or an electronic programming guide box. Further, STB 116 may be incorporated into any multifunctional device such as, a television, a videocassette recorder, a digital video recorder, a computer, a personal computer media player, or other media device. Generally, STB 116 represents a dedicated data processing system (e.g., computer) that provides an interface between a display and a service provider. As shown, STB 116 is connected to the service provider through RG 114. Although a gateway is shown in FIG. 1, other types of modems may be employed. Alternatively, STB 116 may be connected directly to provider network 112.

STB 116 may contain software or firmware instructions stored in memories (not shown) or other storage for receiving and processing input from RCU 118. In some embodiments, STB 116 is an IP based STB and has capability for outputting resultant multimedia signals (e.g., streaming audio/video) in various formats including S-video, composite video, high definition component video, high definition multimedia interface (HTMI), and video graphics array (VGA) signals. The resultant multimedia signals may support display 120 that have various video modes including analog NTSC, 1080i, 1080p, 480i, 480p, 720p, as examples. In some embodiments, STB 116 communicates with RG 114 over local area networks (LANs) connected using CAT5 cables, CAT6 cables, wireless interfaces, or a Home Phoneline Networking Alliance (HPNA) network, as examples.

As shown in FIG. 1, STBs 116 are coupled to displays 120. Each display 120 may include a cathode ray tube (CRT), television, monitor, projected image, liquid crystal display (LCD) screen, holograph, or other graphical equipment.

STB 116 communicates with RCU 118. STB 116 may include wireless transceivers, such as interface port 119, to communicate with wireless transceivers, such as interface port 123, of RCU 118. Although the term "buttons" is used to describe some embodiments herein, other forms of input may be used. For example, touch screens associated with RCU 118 may be used to accept user input. Alternatively, RCU 118 may be used in conjunction with STB 116 to operate graphical user interfaces (GUIs) displayed on displays 120.

STB 116 may receive data, which may include video content and/or audio content or portions, from the IPTV system 102 via the provider network 112. In addition to or in conjunction with STB components illustrated in FIG. 1, STB 116 may contain modules for transport, de-multiplexing, audio/video encoding and decoding, audio digital to analog converting, and RF modulation. For clarity, such details for these modules are not shown in FIG. 1. In addition, details for allowing STB 116 to communicate through provider network 112 through RG 114 are not shown in FIG. 1 for clarity. However, such communications can be carried out with known protocols and systems for network interfacing such as conventional network interface cards (NICs) used in personal computer platforms. For example STB 116 may use a network interface that implements level 1 (physical) and level 2 (data link) layers of a standard communication protocol stack by enabling access to a twisted pair or other form of physical network medium and supporting low level addressing using media access control (MAC) addressing. In these embodiments, STB 116 may have a network interface including a globally unique 48-bit MAC address stored in a read-only memory (ROM) or other persistent storage element. Similarly, RG 114 (or other modem) may have a network interface (not depicted) with its own globally unique MAC address. Further, although STB 116 is depicted with various functions in separate components, these components may be implemented with a system on chip (SoC) device that integrates two or more components.

STB 116 may also include a video content storage module, such as a digital video recorder (DVR). In a particular embodiment, STB 116 may communicate commands received from the RCU 118 to the IPTV system 102 via the provider network 112.

Also shown in FIG. 1, CPE 122 includes RCU 118. RCU 118 communicates in a bidirectional manner by sending signals 140 to and receiving signals 130 from STB 116. The bidirectional communication via signals 130 and 140 comprises the remote control interface for STB 116. RCU 118 and STB 116 may communicate using wired or wireless signals to implement the remote control interface. For example, signals 130 and 140 may be RF signals or infrared signals. Other interfaces for signals 130 and 140, such as wired signals, analog or digital signals, etc. are also contemplated. RCU 118 may include an interface port 123 and programming unit 121. In a particular embodiment, interface port 123 and programming unit 121 are combined in a single electronic device. In certain embodiments, RCU 118 also includes a processor and memory (not shown in FIG. 1). Program instructions stored in the memory and executable by the processor of RCU 118 may perform the functionality of programming unit 121.

Accordingly, signals 130 and 140 are transmitted and received between interface ports 119 and 123, between the STB 116 and the RCU 118. Although depicted as two distinct paths, the signals 130 and 140 may be transmitted simultaneously over the same interface medium. Interface ports 119 and 123 enable the STB 116 and the RCU 118 to communicate with each other over the interface medium. In some embodiments, interface ports 119 and 123 include signal transceivers for bidirectional communication.

It is noted that the operating frequency for the interface medium may be selected with specific consideration of the target CPE 122 environment. For example, if the interface medium is an RF wireless interface, a survey of the customer premises may be performed to determine if additional RF wireless devices are present, and which specific frequency bands are being used at that location. The allowable frequencies for the interface ports 119 and 123 may be then selected or restricted based on the available bandwidth at the specific location. In some embodiments, an installation feature for CPE 122 may be provided, which allows for inputting the conflicting devices or frequencies, to determine allowable frequencies for STB 116 and RCU 118.

As shown, communications platform 100 is configured to provide multimedia content to users of STBs 116. Each system 102, 104, 106 and 108 may be coupled to a private network, to a public network (e.g., the Internet), or to both the private network and the public network (not shown for clarity in FIG. 1). Any of the various systems coupled to the various networks may communicate with each other over the networks, shown collectively in FIG. 1 as provider network 112. In certain embodiments, storefront unit 110 is implemented as a virtual module that provides a GUI on display 120 controlled and provided by STB 116, and systems 102, 104, 106 and 108 directly access provider network 112. The interconnections between illustrated tiers and networks in FIG. 1 are meant as instructive and not limiting.

Figure 2:
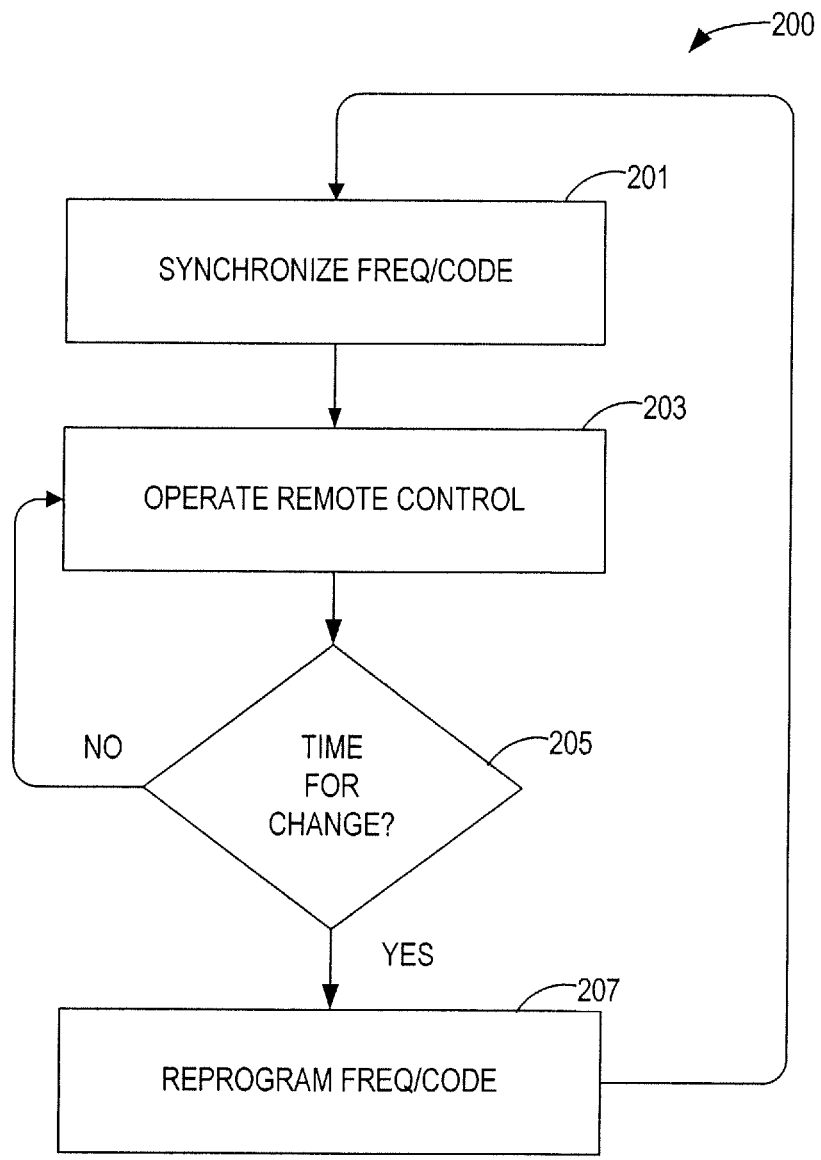
FIG. 2 illustrates representative operations relating to an embodiment of a remote control restricting system.

FIG. 2 illustrates in block diagram form a method 200 for restricting a remote control interface port 119 of an STB 116. It is noted that individual operations described in method 200 may be optional or performed in a different sequence, depending on the specific embodiment. In some embodiments, the method 200 is performed, at least in part, by either STB 116 or RCU 118. In certain embodiments, method 200 is performed, at least in part, by an external device coupled to provider network 112. As depicted in FIG. 2, method 200 is a continuous operation, which represents the continuous operation of communications platform 100. It will be understood that in an initial iteration, for example on power-up of CPE 122, method 200 may begin at operation 201. In other embodiments, method 200 may include an initialization operation, not shown in FIG. 2.

In operation 201, the signals 130 and 140 are synchronized between STB 116 and RCU 118. In one aspect, the frequency of the carrier signals 130 and 140 may be synchronized. Either STB 116 or RCU 118 may be configured to adapt its own operating frequency based on a received signal from the other. In some cases, both STB 116 and RCU 118 follow a predetermined change schedule, and therefore synchronize an internal time base in operation 201. Additionally, in certain embodiments STB 116 and RCU 118 communicate using digital signals and may synchronize the code set, or library of digital codes, used for sending commands to STB 116. In some embodiments, RCU 118 galvanically contacts a terminal provided on STB 116 in order to synchronize in operation 201. The pattern of frequency shifting and/or code set selection may be implemented in the change schedule, which can be predetermined and stored in a memory, as will be discussed further in detail below.

In certain embodiments, an encryption algorithm is used in operation 201. For example, an RCU 118 may contain a key which is used to encrypt a binary code sent to STB 116. The STB 116 may be configured to accept the encrypted code and to decrypt it using an appropriate key. In some embodiments, STB 116 is configured to accept commands via its interface port 119 from a single RCU 118, which has been configured with the corresponding key. Encryption may be used in conjunction with any of the other methods for restricting a remote control as described herein.

Upon completion of operation 201, STB 116 and RCU 118 are configured to communicate with each other to remotely control STB 116.

In operation 203, the user uses RCU 118 to remotely control STB 116. Operation 203 represents the normal operating mode for CPE 122. In many embodiments, the user remains unaware that method 200 is being performed, and perceives that the CPE 122 persists in operation 203. Periodically, however, operation 205 may be performed, which determines if a change in the communication parameters of the remote control interface between STB 116 and RCU 118 should be performed. The determination in operation 205 may be the result of a comparison of the elapsed time with a series of events, for example, in the change schedule. Operation 205 may also simply query a change event flag, or a similar data element, and return a Boolean result, YES or NO. If the result of operation 205 is NO, then execution returns to operation 203, and no change is performed. However, if the result of operation 205 is YES, then execution continues to operation 207.

In operation 207, at least some of the communication parameters associated with the remote control interface of STB 116 are reprogrammed. In some embodiments, operation 207 is executed to initialize method 200, such that the communication parameters are initially programmed in operation 207. Reprogramming the communication parameters may involve changing the operating frequency of interface ports 119 and 123. In some embodiments, the operating frequency is selected from a given set of frequencies, which are constantly re-used. Operation 207 may also include designating a code set, for example, by defining a memory page where the code sets are stored. In certain embodiments, a combination of frequency shifting and code set selection is performed in operation 207. In some embodiments, RCU 118 galvanically contacts a terminal provided on STB 116 in order to reprogram in operation 207.

The control of operation 207 may originate from different sources in some embodiments. For example, the STB 116 may store the change schedule and enforce a predetermined sequence of change events. In some embodiments, the RCU 118 includes a processor and memory which stores the change schedule. In still other embodiments, the change schedule is enforced via network 112 from another network device, such as a server system, which stores the change schedule for each individual CPE 122 in a memory. The change schedule includes change events, which when executed, cause communication parameters to be reprogrammed on STB 116 and/or RCU 118. It is noted that the enforcement and processing to implement the change schedule may involve a combination, or sharing of the control responsibilities. For example, a network device may provide a trigger at random intervals to cause the next change event to be performed, while the information about specific frequencies and code sets to be programmed may be stored locally at the CPE 122. In some embodiments, RG 114 acts as the controller for the change schedule in operation 207. In certain embodiments, programming units 117 and 121 include a wireless interface for receiving commands independently of each other, for example, from a wireless router or access point. After operation 207 has been completed, STB 116 and RCU 118 are programmed with the new communication parameters. In some embodiments, operation 201 (i.e., synchronization) may be omitted and method 200 may proceed directly to operation 203.

Figure 3:
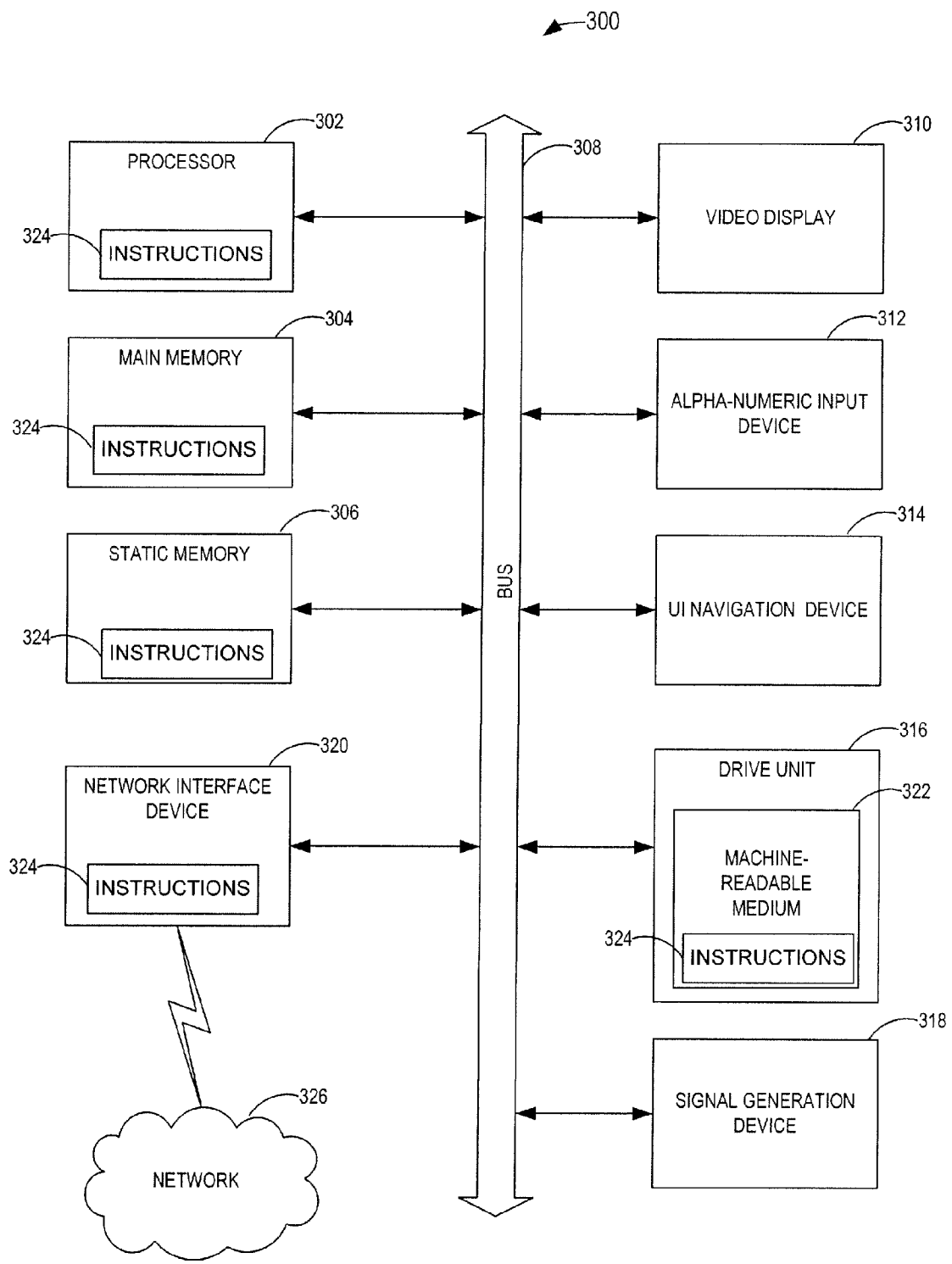
FIG. 3 depicts a data processing system in block diagram form that may be incorporated into disclosed embodiments of the remote control restricting system of FIG. 2.

FIG. 3 is a diagrammatic representation of a machine in the example form of a computer system 300 within which a set of instructions for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a DVR, a personal computer (PC), a tablet PC, an STB, a remote control unit, a cable box, a satellite box, an electronic programming guide box, a Personal Digital Assistant (PDA), a cellular telephone, a smart phone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The main memory 304 and/or the static memory 306 may be used to store the channel history data. The computer system 300 may further include a video display unit 310 (e.g., a television, an LCD or a CRT) on which to display broadcast or other programs, for example. The computer system 300 also includes an alphanumeric input device 312 (e.g., a keyboard or a remote control), a user interface (UI) navigation device 314 (e.g., a remote control, or a mouse), a disk drive unit 316, a signal generation device 318 (e.g., a speaker) and a network interface device 320. The input device 312 and/or the navigation device 314 (e.g., the remote control) may include a processor (not shown), and a memory (not shown). The disk drive unit 316 includes a machine-readable medium 322 on which is stored one or more sets of instructions and data structures (e.g., instructions 324) embodying or utilized by any one or more of the methodologies or functions described herein. The instructions 324 may also reside, completely or at least partially, within the main memory 304 and/or within the processor 302 during execution thereof by the computer system 300.

The instructions 324 may further be transmitted or received over a network 326 (e.g., a television cable provider) via the network interface device 320 utilizing any one of a number of well-known transfer protocols (e.g., broadcast transmissions, HTTP). While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure, or that is capable of storing, encoding or carrying data structures utilized by or associated with such a set of instructions. The term "machine-readable medium"

shall accordingly be taken to include, but not be limited to, solid-state memories, optical and magnetic media, and carrier wave signals.

While the disclosed systems may be described in connection with one or more embodiments, they are not intended to limit the subject matter of the claims to the particular forms set forth. On the contrary, they are intended to cover such alternatives, modifications and equivalents as may be included within the spirit and scope of the subject matter as defined by the appended claims.

What is claimed is:

1. A customer premises equipment system, comprising:
   a remote control unit including:
   a first transceiver;
   a first interface port;
   a first processor; and
   a first memory, accessible to the first processor, including first processor executable instructions that, when executed by the processor, cause the processor to perform operations including:
   participating in a bidirectional communication via the first interface port with a set-top box; and
   programming a communication parameter associated with the bidirectional communication;
   wherein the set top box includes:
   a second transceiver;
   a second interface port;
   a second processor;
   a second memory, accessible to the second processor, including second processor executable instructions that, when executed by the second processor, cause the second processor perform operations including:
   participating in the bidirectional communication via the second interface port with the remote control unit; and
   programming a communication parameter associated with the bidirectional communication wherein the communication parameter corresponds to a carrier frequency parameter; and
   a change schedule, stored in a schedule memory selected from the first memory and the second memory, the change schedule including information indicative of:
   change events that cause a change in the communication parameter; and
   a predetermined set of communication parameter values;
   wherein a program memory selected from the first memory and the second memory includes processor executable program instructions, that, when executed, cause a processor to perform operations, including:
   determining, based on the change events, whether it is time to change the communication parameter;
   responsive to determining that it is time to change the communication parameter, determining, based on the predetermined set of communication parameter values, a new value of the communication parameter, wherein the new value is different; and
   changing a current value of the communication parameter to the new value, wherein the new value is different than the current value.

2. The system of claim 1, wherein the bidirectional communication comprises digital communication between the first interface port and the second interface port.

3. The system of claim 1, wherein the first transceiver and the second transceiver are wireless transceivers and wherein participating the bidirectional communication comprises wireless communication.

4. The system of claim 1, wherein the first memory includes the program memory.

5. The system of claim 1, wherein the second memory includes the program memory.

6. The system of claim 5, wherein the program instructions execute in response to the remote control unit galvanically contacting the set-top box.

7. The system of claim 1, wherein the bidirectional communication between the remote control and the set-top box includes encrypted communication.

8. The system of claim 1, wherein the second memory includes a removable storage medium.

9. The system of claim 1, wherein the change schedule indicates random points in time.

* * * * *